United States Patent
Shrivastava et al.

(10) Patent No.: US 11,835,978 B1
(45) Date of Patent: Dec. 5, 2023

(54) POWER SUPPLY SLUMP REDUCTION METHODS AND DEVICES

(71) Applicant: pSemi Corporation, San Diego, CA (US)

(72) Inventors: Ravindranath D. Shrivastava, San Diego, CA (US); Payman Shanjani, San Diego, CA (US)

(73) Assignee: pSemi Corporation, San Diego, CA (US)

(*) Notice: Subject to any disclaimer, the term of this patent is extended or adjusted under 35 U.S.C. 154(b) by 0 days.

(21) Appl. No.: 17/893,677

(22) Filed: Aug. 23, 2022

(51) Int. Cl.
*G05F 1/46* (2006.01)
*H02M 3/07* (2006.01)

(52) U.S. Cl.
CPC ............ *G05F 1/46* (2013.01); *H02M 3/07* (2013.01)

(58) Field of Classification Search
None
See application file for complete search history.

(56) References Cited

U.S. PATENT DOCUMENTS

| | | | | |
|---|---|---|---|---|
| 5,708,599 A | * | 1/1998 | Sato | G11C 11/418 365/189.09 |
| 6,690,226 B2 | * | 2/2004 | Takai | G05F 3/205 327/530 |
| 6,940,777 B2 | * | 9/2005 | Ooishi | G11C 29/028 365/189.09 |
| 9,972,365 B2 | * | 5/2018 | Liu | G11C 5/04 |
| 2008/0272657 A1 | * | 11/2008 | Hull | G11C 5/147 307/130 |

* cited by examiner

*Primary Examiner* — Thomas J. Hiltunen
(74) *Attorney, Agent, or Firm* — Steinfl + Bruno LLP

(57) ABSTRACT

Methods and devices to reduce or remove slumps in power supplies are disclosed. The disclosed teachings can serve various applications, such as applications implementing RF switches. Using such teachings, an integrated method can benefit from two different modes of operation where either an external or an internal charge pump can be used to provide a desired negative voltage to various components within the integrated circuit. This can be done by disposing a larger load capacitor outside the integrated circuit and without compromising any die space requirement.

20 Claims, 11 Drawing Sheets

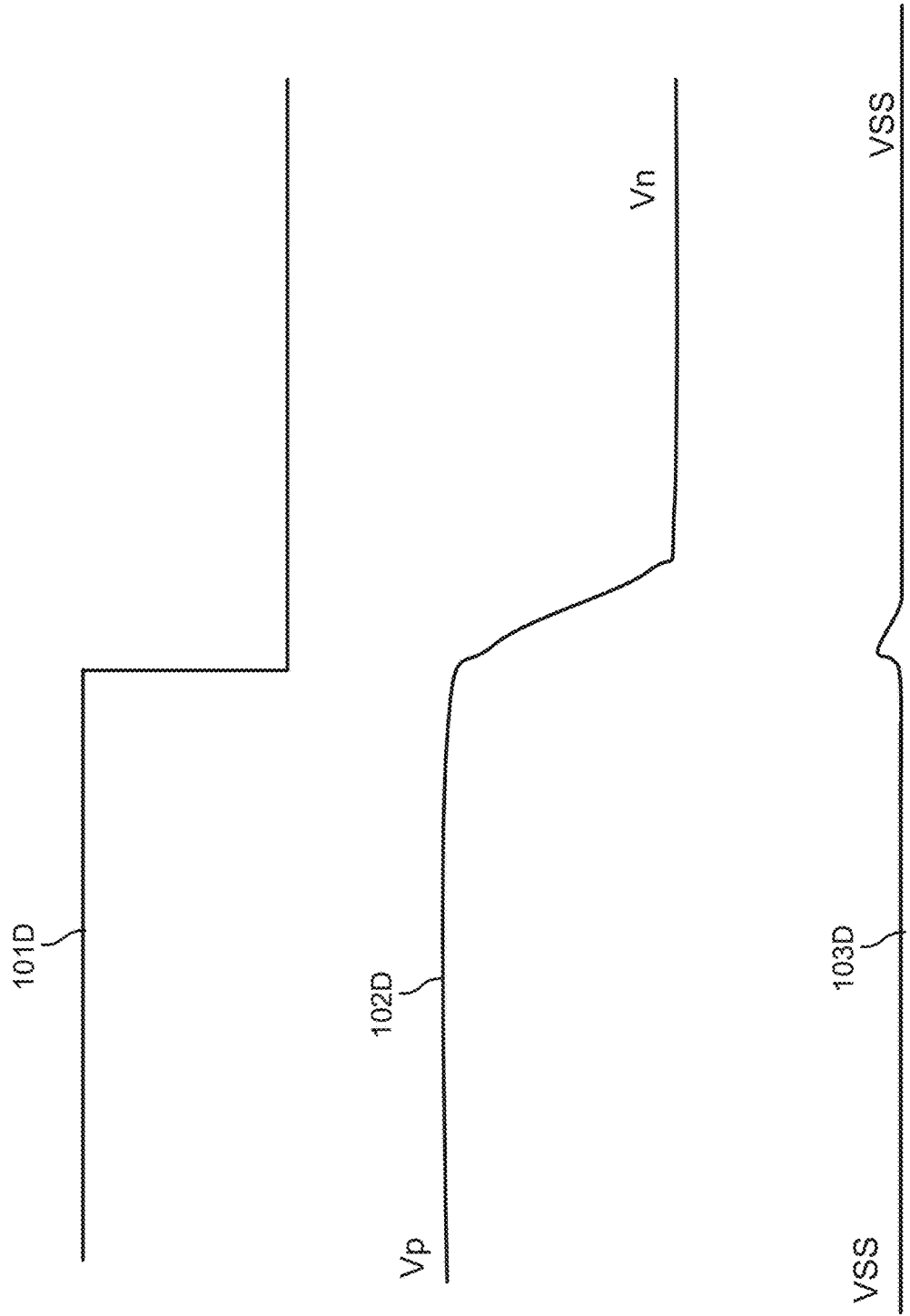

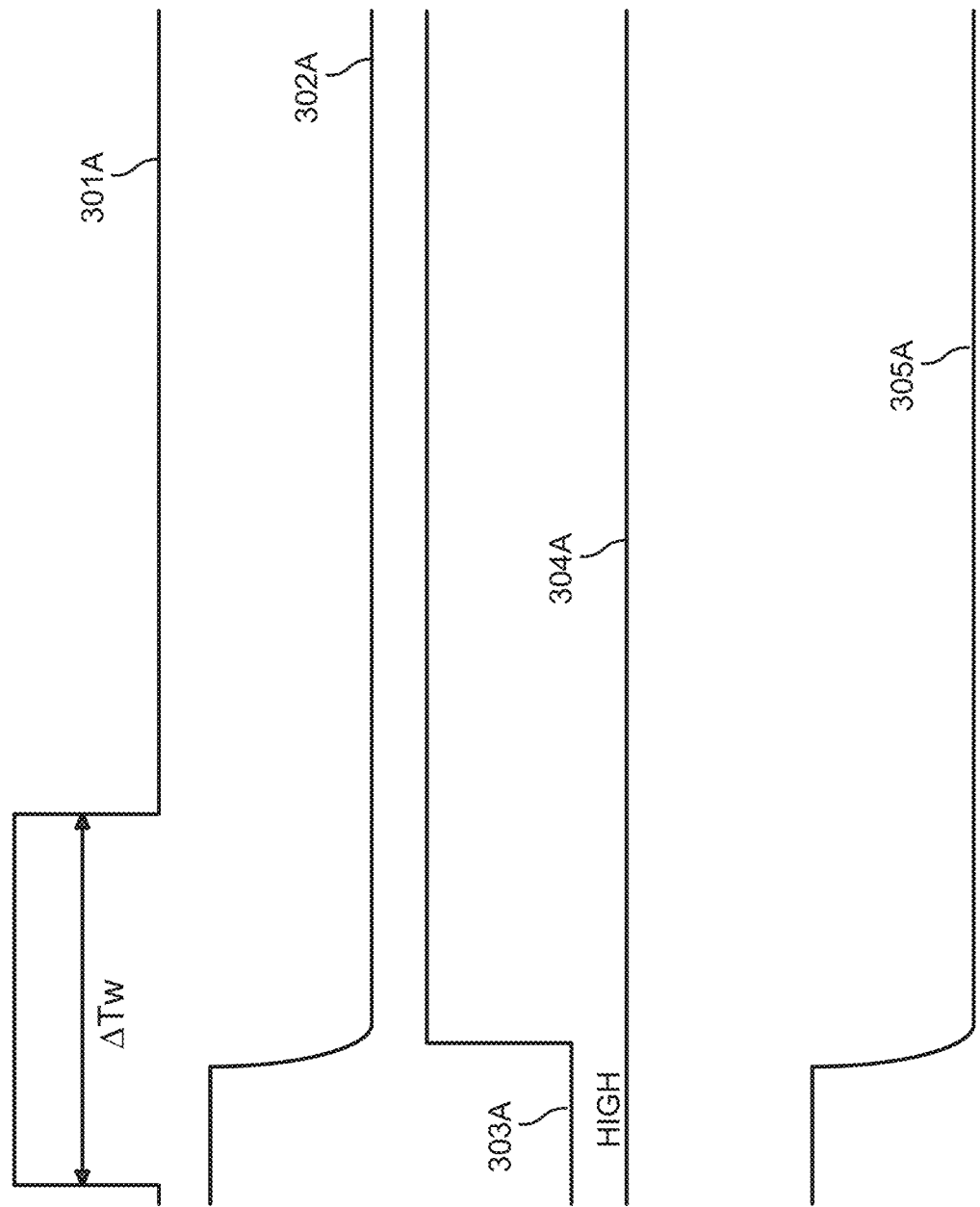

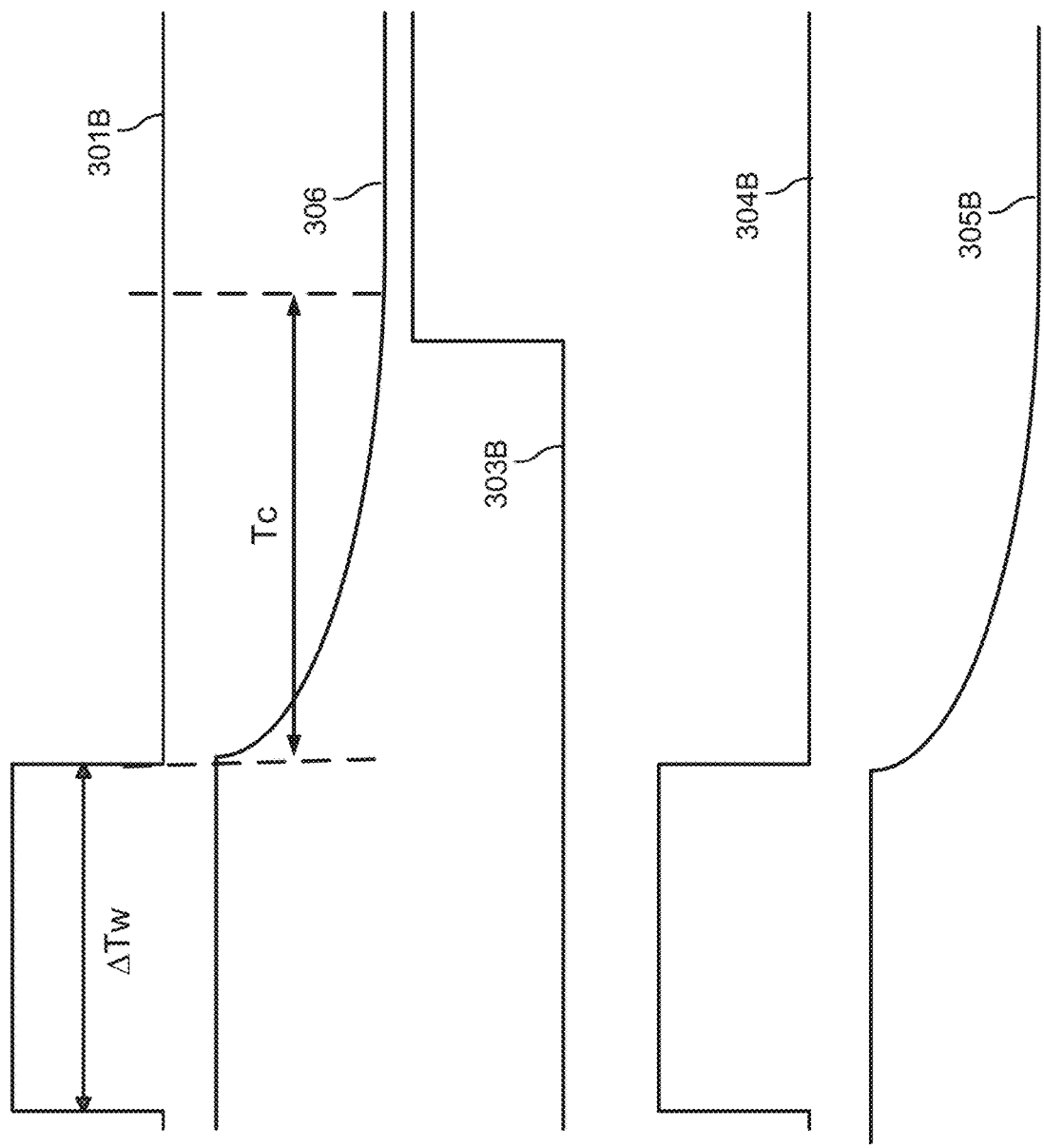

POWER SUPPLY SLUMP REDUCTION METHODS AND DEVICES

TECHNICAL FIELD

The present disclosure is related to methods and devices to reduce or remove slumps in power supplies. The disclosed methods can serve various applications, more in particular the ones implementing RF switches.

BACKGROUND

The performance of different components implemented as part of an electronic circuit may be negatively impacted by temporary voltage slumps at the output of power supplies used to bias such components. The term "voltage slump" or "power supply slump" is used to intend a temporary and undesired low voltage condition that does not reflect the true condition of the power supply. A typical example is a radio frequency (RF) circuit having power switches implemented, for example, using field-effect transistors (FET). The power handling of such switches when in OFF state depends on the bias voltage applied to their gate terminals. As an example, depending on the overall circuit requirements, a certain negative voltage, e.g. −3.5 V, may be needed at the FET gate terminal when a switching transition from ON to OFF state occurs. However, a certain time is often needed for the gate terminal of the switches to settle to the required value. FIG. 1A shows a prior art graph (100A) illustrating such settling time. Curve (101A) represents the control signal indicating a switching event taking place at instant (T1) when the switch starts transitioning from the ON to OFF state. Curve (102A) represents the voltage at the gate terminal of the switch sitting at positive voltage (Vp) when the switch is ON and settling to a negative voltage (Vn) after the switch is settled (i.e. at and after time instant (T2)), and is completely OFF. As can be seen, the settling time before the gate terminal voltage reaches voltage (Vn) is equal to $\Delta T=T_2-T_1$.

With reference to FIG. 1A, the settling time as described above depends on the RC time constant at the gate terminal of the switch wherein the resistance R depends on the biasing scheme, and capacitor C is essentially the off capacitance of the switch which depends on the switch size. Another factor impacting such settling time is the possible power supply slump occurring during the switching event when the switch is transitioning from the ON to the OFF state.

In order to further clarify the effect of the power supply slump on the switch settling time as described above, reference is made to FIG. 1B showing an integrated circuit (105) including a power supply block (110) which is used to bias other components (not shown) of the integrated circuit (105). Power supply block (110) includes an (LDO) low dropout voltage regulator (120) and a negative power supply (130). In an embodiment, a positive charge pump may be implemented instead of LDO (120). Power supply block (110) is configured to receive a positive supply voltage from a first external power supply (P1) and a negative supply voltage from a second external power supply (P2). Negative power supply (130) further includes a negative charge pump (131) and two switches (S1, S2). Also shown in FIG. 1B is load capacitor (CL) coupled to terminal (N2). LDO (120) regulates the positive supply voltage to provide regulated positive voltage (VDD) at terminal (N1). Such positive voltage can be used to bias the rest of the circuits implemented inside integrated circuit (105). For example, with reference to FIGS. 1A-1B, and to the previously mentioned example of power switches, positive voltage (VDD) can be used to provide the required voltage (Vp) at the gate terminals of the power switches (not shown) inside integrated circuit (105) when such switches are in ON state.

With further reference to FIG. 1B, negative power supply (130) provides a negative bias voltage (VSS) at terminal (N2). This can be done either through the internal negative charge pump (131), or else through the second external power supply (P2). In other words, by turning switch (S1) on (closed), and switch (S2) off (open), the internal negative charge pump (131) is selected to provide negative bias voltage (VSS). On the other hand, by turning switch (S1) off, and switch (S2) on, the charge pump will be shut off and the external power supply (P2) is used to generate the negative bias voltage (VSS).

With further reference to FIG. 1B, as mentioned above, there are applications where the external power supply (P2) is not available or cannot be used. As such, the internal charge pump will serve as the provider of the negative bias voltage (VSS). In this case, load capacitor (CL) is charged through charge pump (131) to generate the negative charges required by the rest of the circuit. In most applications, the die space requirements are stringent and as a result, implementing larger size load capacitors may be prohibitive due to such die space requirements. This means, due to the small size of the load capacitor (CL), when charged by the negative charge pump (131), the amount of the negative charge across the load capacitor may not be sufficient, and as a result, a slump will appear across load capacitor (CL). Such slump may occur whenever the is a high demand for negative charge needed to bias, for example, a large RF switch. As a result, there is a delay before the charge pump is able to provide all of the negative charge required by other circuit components across the load capacitor. This may result in an undesired negative impact on the performance of the rest of the circuit. Turning now back to the example of the RF power switches as described above, the insufficient negative charge across the load capacitor during a transition can result in a larger switching time in the event of transitioning from the ON state to the OFF state. This is illustrated in FIG. 1C. Similar to what was described with regards to FIG. 1A, curve (101C) represents the control signal indicating a switching event taking place at instant (T1') when the switch starts transitioning from the ON to OFF state. Curve (102C) represents the voltage at the gate terminal of the switch sitting at positive voltage (Vp) when the switch is ON and settling to a negative voltage (Vn) after the switch is settled (i.e. at and after time instant (T2')), and is completely OFF. Curve (103C) represents the voltage seen at terminal (N2) of FIG. 1B, during the transition. As shown, a slump (i.e. drooping towards positive voltage direction) occurs during the transition slowing down the settling time of the switch, which is in this case equal to $\Delta T'=T_2'-T_1'$. The smaller the load capacitor size, the larger the slump, and the slower will be the transition of the RF switches.

Referring now back to FIG. 1B, in the applications where the external power supply (P2) can be used, the presence of the load capacitor is optional, and the external power supply can essentially provide all the negative charges required with no issue. This is illustrated in FIG. 1D showing a faster transition, i.e. curve (102D), as the slump on the power supply as shown by curve (103D) is almost negligible in this case.

SUMMARY

In view of the above, in the applications where a negative power supply internal to the integrated circuit is used, there is a need for a solution to overcome the supply voltage slump. This will help avoid undesired performance degradations (e.g. slower transition in power switches) caused by such voltage slump.

The disclosed methods and devices address the above-mentioned voltage slump issues in the integrated circuits implementing internal negative voltage supply blocks such as charge pumps.

According to a first aspect of the present disclosure, an integrated circuit is provided, comprising an internal negative power supply internal to the integrated circuit; a detector and control circuit configured to connect and disconnect the internal negative power supply to/from a negative bias voltage terminal internal to the integrated circuit, wherein in a first mode, upon detection of the presence of an external negative power supply external to the integrated circuit, the detector and control circuit is configured to disconnect the internal negative power supply from the negative bias voltage terminal; and in a second mode, upon detection of the absence of the external negative power supply external to the integrated circuit, the detector and control circuit is configured to connect the internal negative power supply to the negative bias voltage terminal to provide an internally sourced negative bias voltage to the integrated circuit.

According to a second aspect of the present disclosure, an integrated circuit is provided, comprising an internal negative power supply internal to the integrated circuit; a detector and control circuit configured to connect and disconnect the internal negative power supply or the external negative power supply to/from a negative bias voltage terminal internal to the integrated circuit, wherein in a first mode, upon detection of presence of an external negative power supply external to the integrated circuit and connectable to the integrated circuit, the detector and control circuit is configured to disconnect the internal negative power supply from the negative bias voltage terminal and connect the external negative power supply to the negative bias voltage terminal to provide an externally sourced negative bias voltage to the integrated circuit; and in a second mode, upon detection of absence of an external negative power supply external to the integrated circuit, the detector and control circuit is configured to connect the internal negative power supply to the negative bias voltage terminal to provide an internally sourced negative bias voltage to the integrated circuit.

According to a third aspect of the present disclosure, a method of providing a negative bias voltage to a negative bias voltage terminal of an integrated circuit is disclosed, the negative bias voltage terminal being internal to the integrated circuit, the integrated circuit comprising an internal negative power supply, the method comprising: in a first mode: detecting presence of an external negative power supply external to the integrated circuit; disconnecting the negative internal power supply from the internal negative bias voltage terminal; and connecting the external negative power supply to the negative bias voltage terminal, and in a second mode: detecting absence of the external negative power supply; coupling the negative bias voltage terminal to ground via an external load capacitor, the external load capacitor being disposed external to the integrated circuit; connecting the internal negative power supply to the negative bias voltage terminal, thereby charging the external load capacitor with negative charge served as the negative bias voltage.

Further aspects of the disclosure are provided in the description, drawings and claims of the present application.

DESCRIPTION OF THE DRAWINGS

FIGS. 1C-1D show timing diagrams related to power supply slump.

FIGS. 3A-3B show exemplary timing diagrams associated with the functionality of the detector and control module according to an embodiment of the present disclosure.

Like reference numbers and designations in the various drawings indicate like elements.

DETAILED DESCRIPTION

Figure 1A:
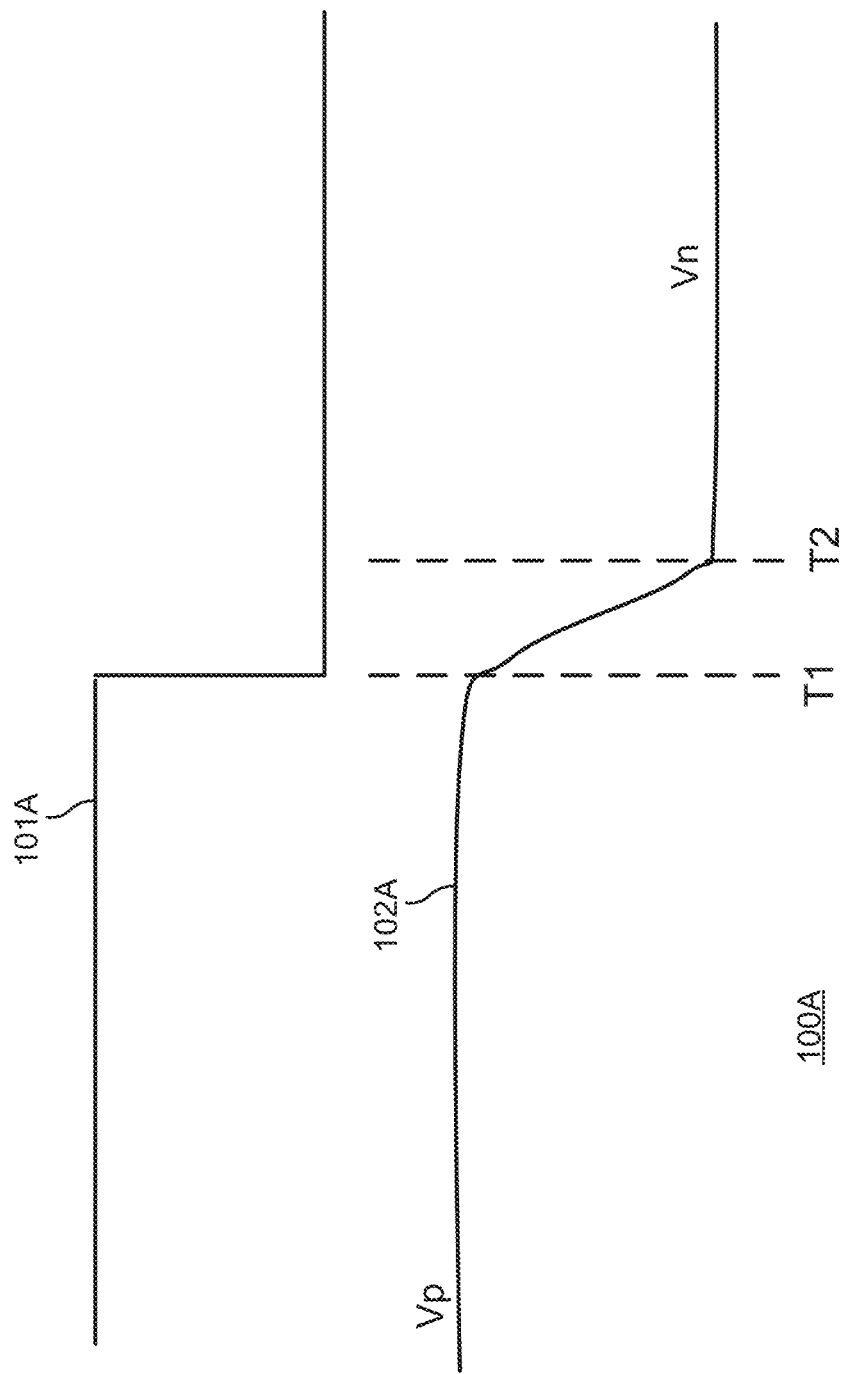
FIG. 1A shows a prior art graph illustrating the timing diagrams associated with the transition of a radio frequency switch from the ON to OFF state.
Figure 1B:
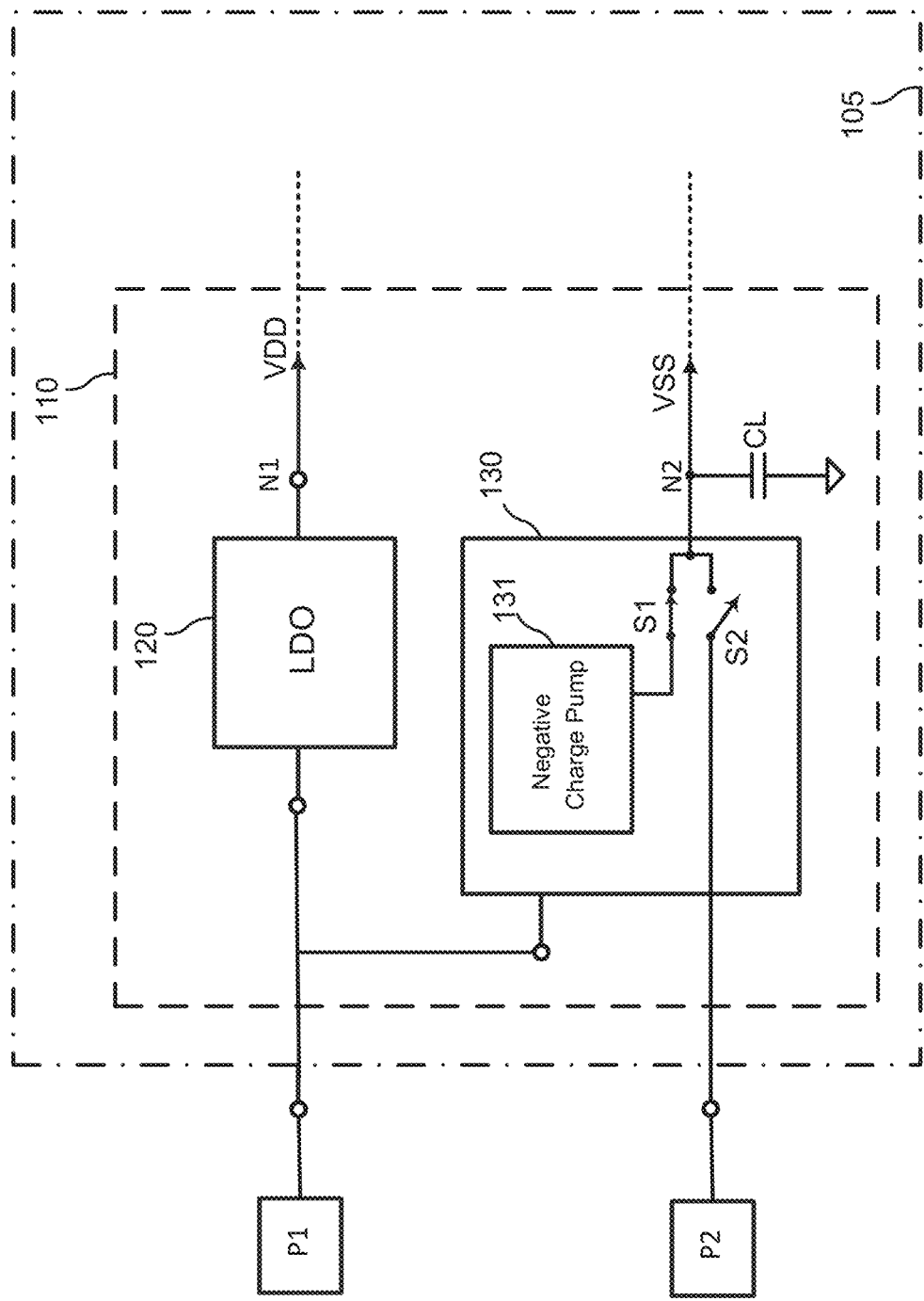
FIG. 1B shows a prior art integrated circuit.
Figure 1C:
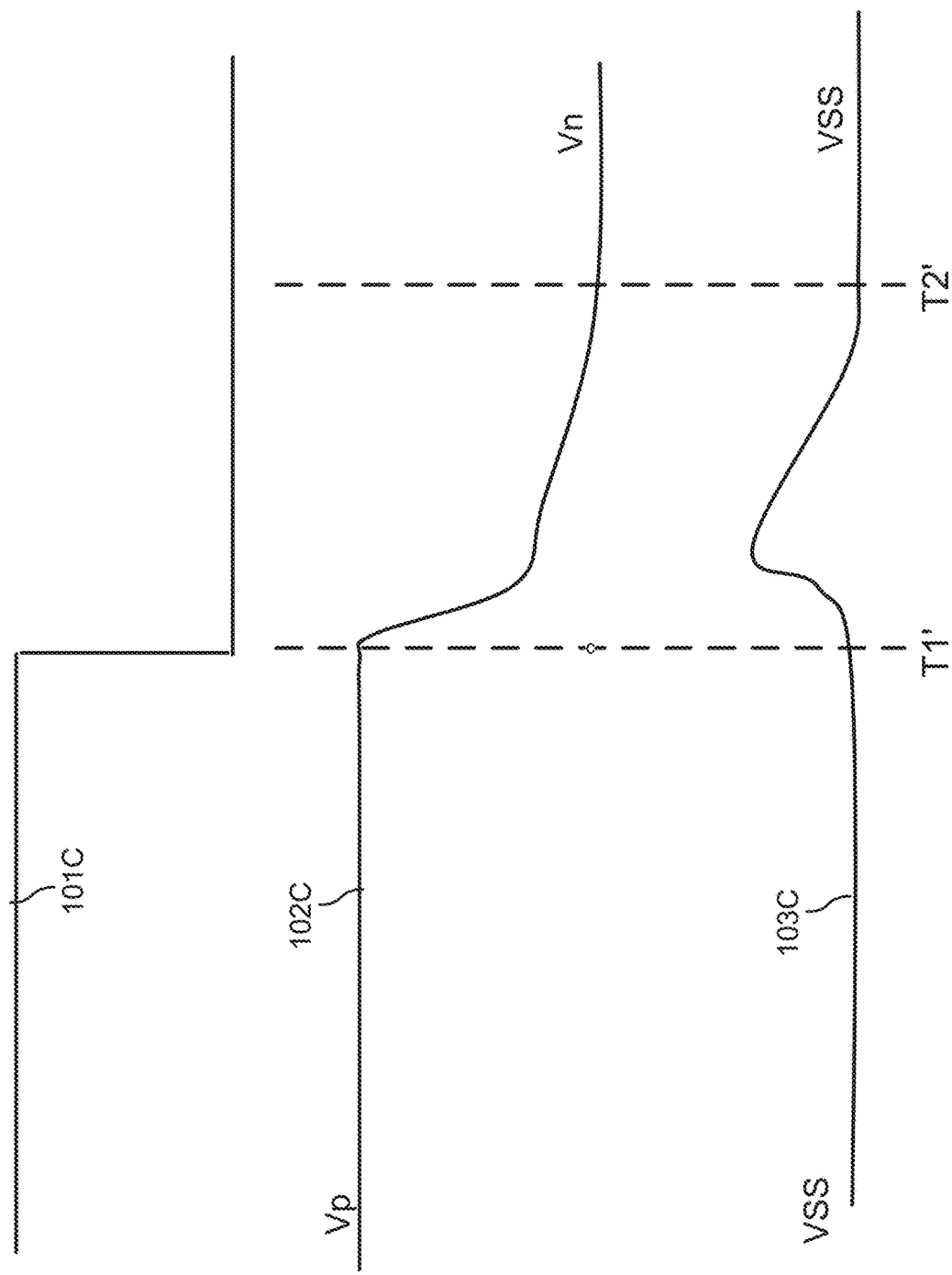
Figure 2A:
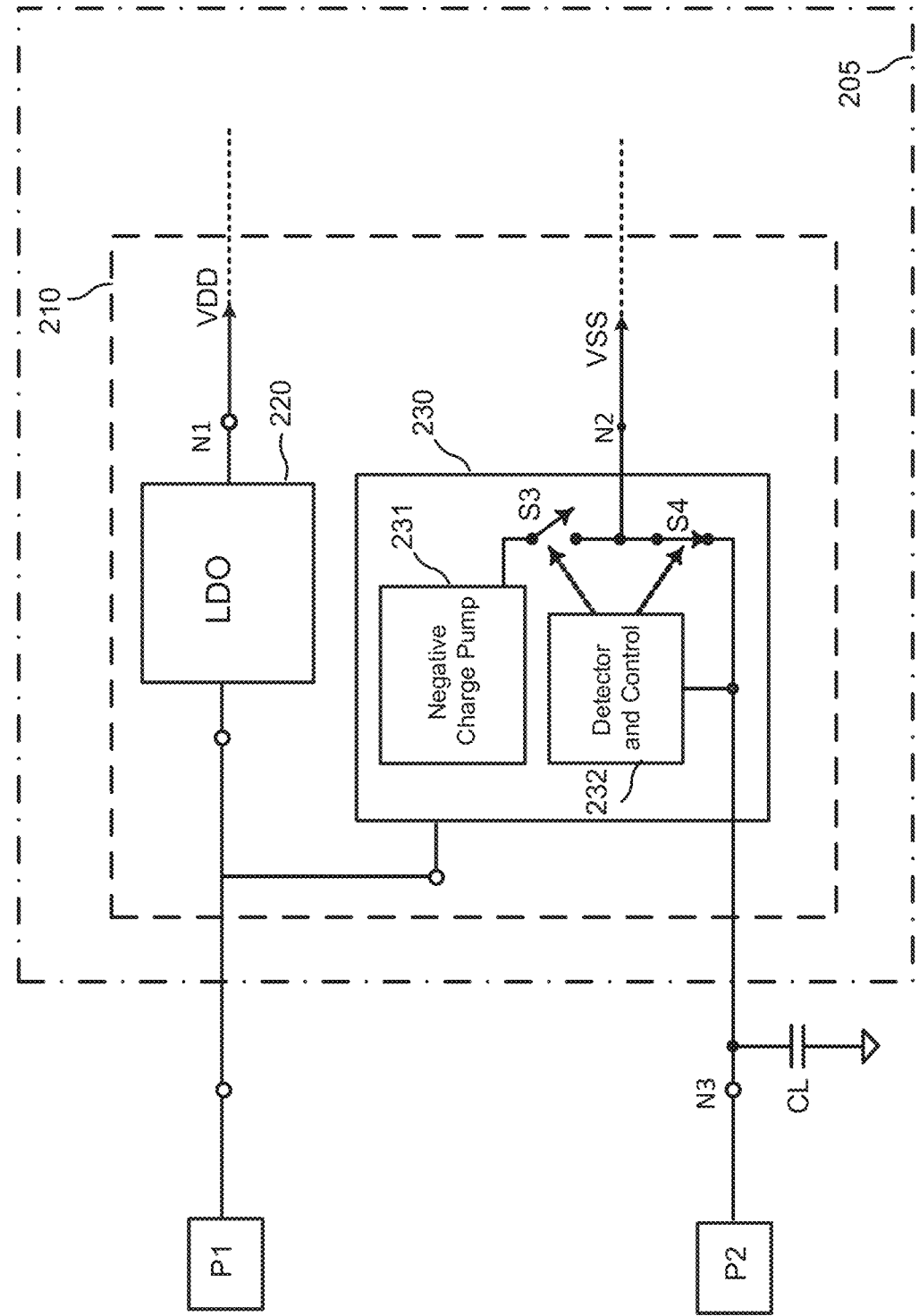
FIGS. 2A-2C show exemplary integrated circuits according to an embodiment of the present disclosure.

FIG. 2A shows an integrated circuit (205) according to an embodiment of the present disclosure. Integrated circuit (205) comprises a power supply block (210) which is used to bias other components (not shown) of the integrated circuit (205). Power supply block (210) comprises an optional (LDO) low dropout voltage regulator (220) and a negative supply circuit or module (230). Similar to what was described with regards to integrated circuit (105) of FIG. 1B, power supply block (210) is configured to receive a positive supply voltage from a first external power supply (P1) and a negative supply voltage from a second external power supply (P2). Negative power supply (230) further comprises a negative charge pump (231), detector and control circuit or module (232), and switches (S3, S4). In contrast with integrated circuit (105) of FIG. 1B, load capacitor (CL) is now disposed at terminal (N3) outside integrated circuit (205). The principle of operation and function of the optional LDO (220) is similar to what was described with regards LDO (120) of FIG. 1B.

According to the teachings of the present disclosure, the embodiment of FIG. 2A can operate in two modes. In a first mode corresponding to the applications where an external power supply (P2) can be used, the detector and control module (232) has the role of detecting the presence of external power supply (P2). After such detection, detector and control module (232) will issue control signals to turn switch (S3) OFF (open) and switch (S4) ON (closed). As a result, negative charge pump (231) is switched out and shut off, and negative bias voltage (VSS) is provided directly from external power supply (P2) which is switched in. In the first mode, load capacitor (CL) is optional, and the issue of voltage slump is practically non-existent as the external power supply (P2) is able to provide all the negative charges required to generate negative bias voltage (VSS). In other words, turning back to the exemplary application where integrated circuit (205) includes RF power switches, the settling time of such switches when transitioning from the ON to OFF state will not be compromised due to power supply voltage slump issues as detailed previously. According to the teachings of the present disclosure, switch (S4) is optional. In other words, embodiments implementing the two mentioned modes without switch (S4) may also be envisaged.

Figure 2B:
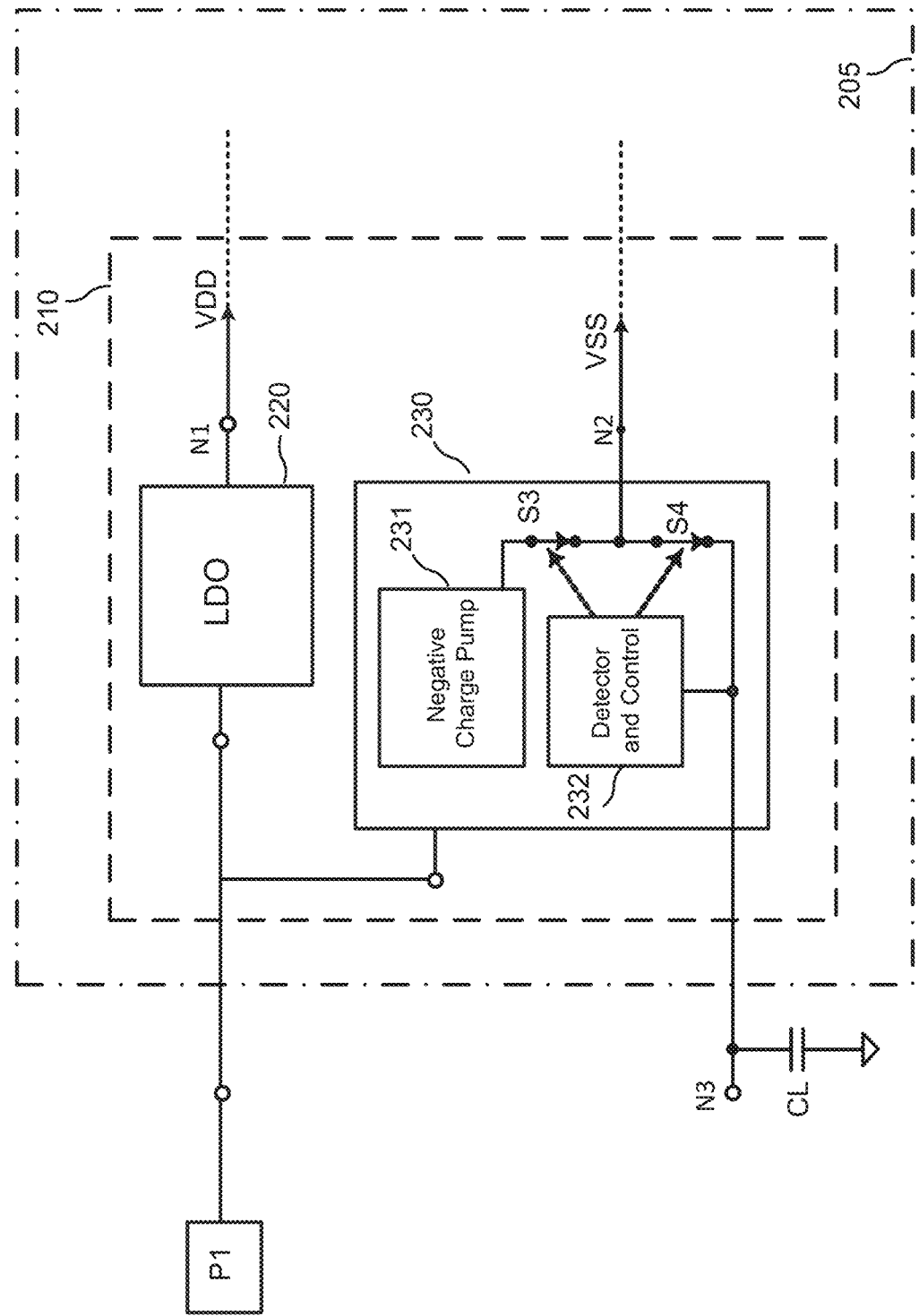
Figure 2C:
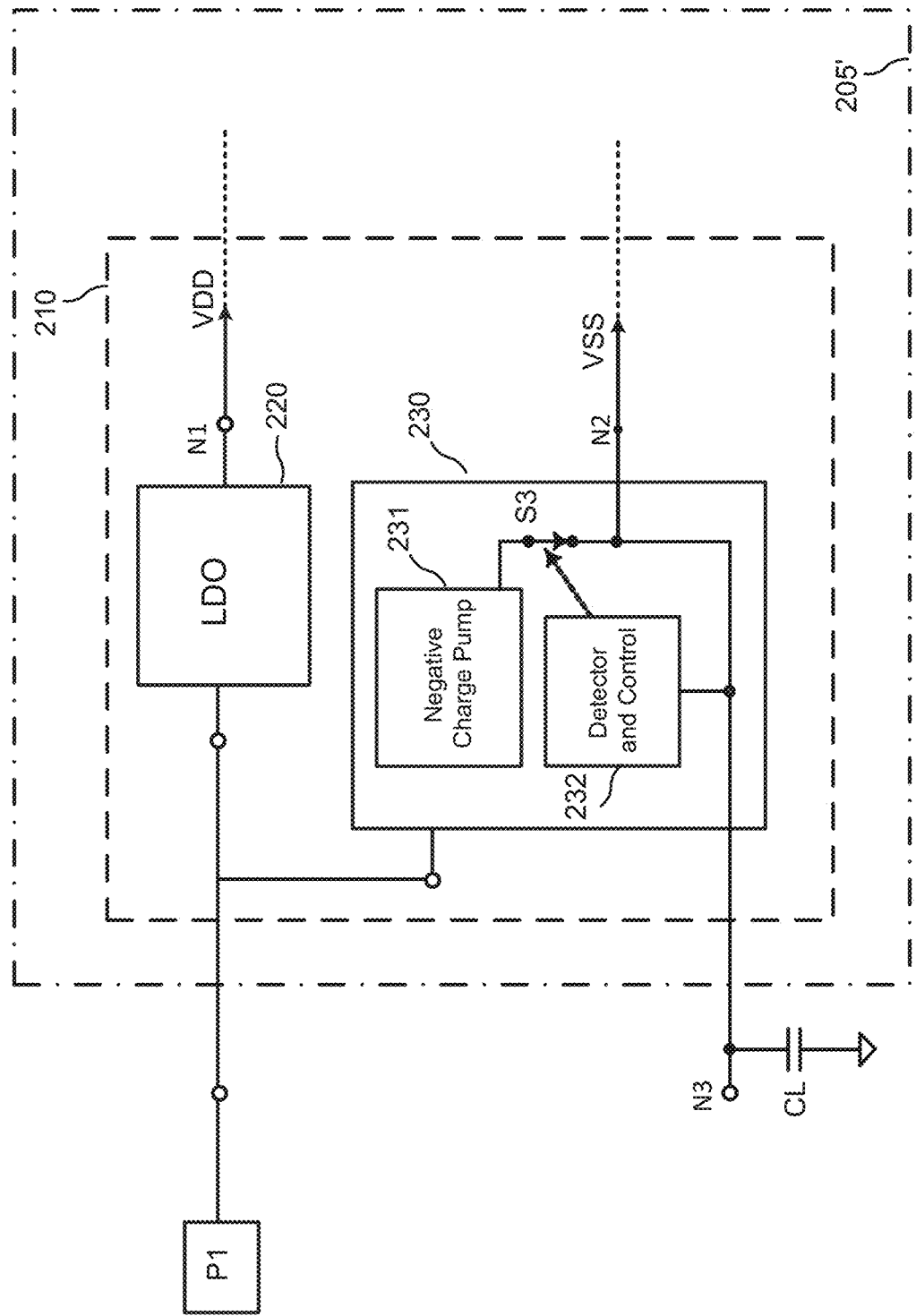

FIG. 2B represents the second mode of operation of integrated circuit (205). The second mode corresponds to the applications where an external power supply is not available or cannot be used. In this case, upon detecting the absence of the external power supply, detector and control module (232) will provide control signals to turn both switches (S3, S4) ON (closed). In other words, in this mode, the internal negative charge pump (231) will be used to provide the negative bias voltage (VSS) as required by the rest of the circuits. According to the teachings of the present disclosure, by virtue of disposing the load capacitor (CL) outside integrated circuit (205), larger size capacitors (e.g. 7 nF to 20 nF) can now be implemented without compromising the die space and the performance of the circuits within the integrated circuit. The reason for this is that due to the large size of the load capacitor (CL), the negative charge required by the components within integrated circuit (205) can now be provided without having any voltage slump issue. In other words, when the second mode is selected by the user, at the startup of operation, the load capacitor (CL) will be charged by the negative charge pump (231). Due to the larger size of the load capacitor (CL), such negative charge will be maintained mostly fixed throughout the operation, more in particular, during transition times or switching events where the rest of the circuit requires large negative charge in a short duration for the purpose of bias. The person skilled in the art will appreciate that, integrated circuit (205) can now serve both applications where the external power supply is or is not present, by offering two respective modes of operation and without compromising the integrated circuit overall performance or die area. FIG. 2C shows an integrated circuit (205') according to an embodiment of the present disclosure. The principle of operation of integrated circuit (205') of FIG. 2C is similar to what was described with regards to integrated circuit (205) of FIG. 2B, except that the optional switch (S4) of FIG. 2C is replaced by a wire.

FIG. 3A shows exemplary timing diagrams associated with the functionality of detector and control module (232) of FIGS. 2A-2B. Signal (301A) represents a start up pulse internally generated in the integrated circuit when power supply (P1) of FIG. 2A22B is applied to the integrated circuit and it will be present in both previously mentioned modes of operation. Such pulse width is indicative of a waiting time ($\Delta T_w$) during which the presence or absence of the external power supply (P2) will be detected by detector and control module (232) of FIGS. 2A-2B to decide which one of the first or the second mode of operation is to be enabled. Detector and control module (232) will then issue proper control signals to control switches (S3, S4) of FIGS. 2A-2B in accordance with the detected mode of operation.

FIG. 3A corresponds to the first mode of operation (i.e. external power supply is connected) as disclosed above. As power supply (P2) of FIG. 2A is connected to terminal (N3), the voltage of such terminal goes from 0V to a negative value (e.g. −3.5V) as shown by signal (302A). Such change is detected during the waiting time ($\Delta T_w$), by detector and control module (232). Such module indicates the detection by issuing a signal (303A) going, for example, from LOW to HIGH (rising edge). Signal (304A) represents the control signal to activate or deactivate the charge pump (231). In this exemplary embodiment, a LOW/HIGH state of such control signal is indicative of activation/deactivation of the negative charge pump (231). As shown in FIG. 2A, in this case, which is the first mode of operation, negative charge pump (231) is deactivated. Signal (305) represents the voltage at terminal (N2) which is settled to a negative bias voltage (VSS), e.g. −3.5V, and will be used by the rest of the circuit as needed.

FIG. 3B shows exemplary timing diagrams associated with the functionality of detector and control module (232) of FIGS. 2A-2B when operating in the second mode. The waveforms shown from top to bottom, represents the same signals as in FIG. 3A but behaving differently depending on the mode. In the second mode as shown, no external power supply is connected to terminal (N3) and as a result, during wait time ($\Delta T_w$), as shown by signal (301B), no negative voltage at terminal (N3) is detected. This means that negative charge pump (231) will be used. Signal (304B) transitions from HIGH to LOW right after the waiting time ($\Delta T_w$) to activate the charge pump. Signal (306) represents the negative charge pump (231) output starting to change after waiting time ($\Delta T_w$) and as a response to the transition of signal (304B) from HIGH to LOW. As shown, the charge pump output will settle to the negative voltage (VSS), e.g. −3.5V, after a duration (Tc). Such duration which is essentially the charge pump start up time, depends on the load capacitor (CL), a fly capacitor typically implemented as part of the charge pump, and the charge pump frequency. Signal (303B) is analogous to signal (303A) of FIG. 3A. As can be noticed, the rising edge of signal (303B) appears this time after the waiting time ($\Delta T_w$) which is an indication of the second mode of operation. Signal (305B) represents the voltage of terminal (N2) of FIG. 2B settling to the required negative bias voltage (VS S) after a duration equal to the charge pump start up time.

Figure 4A:
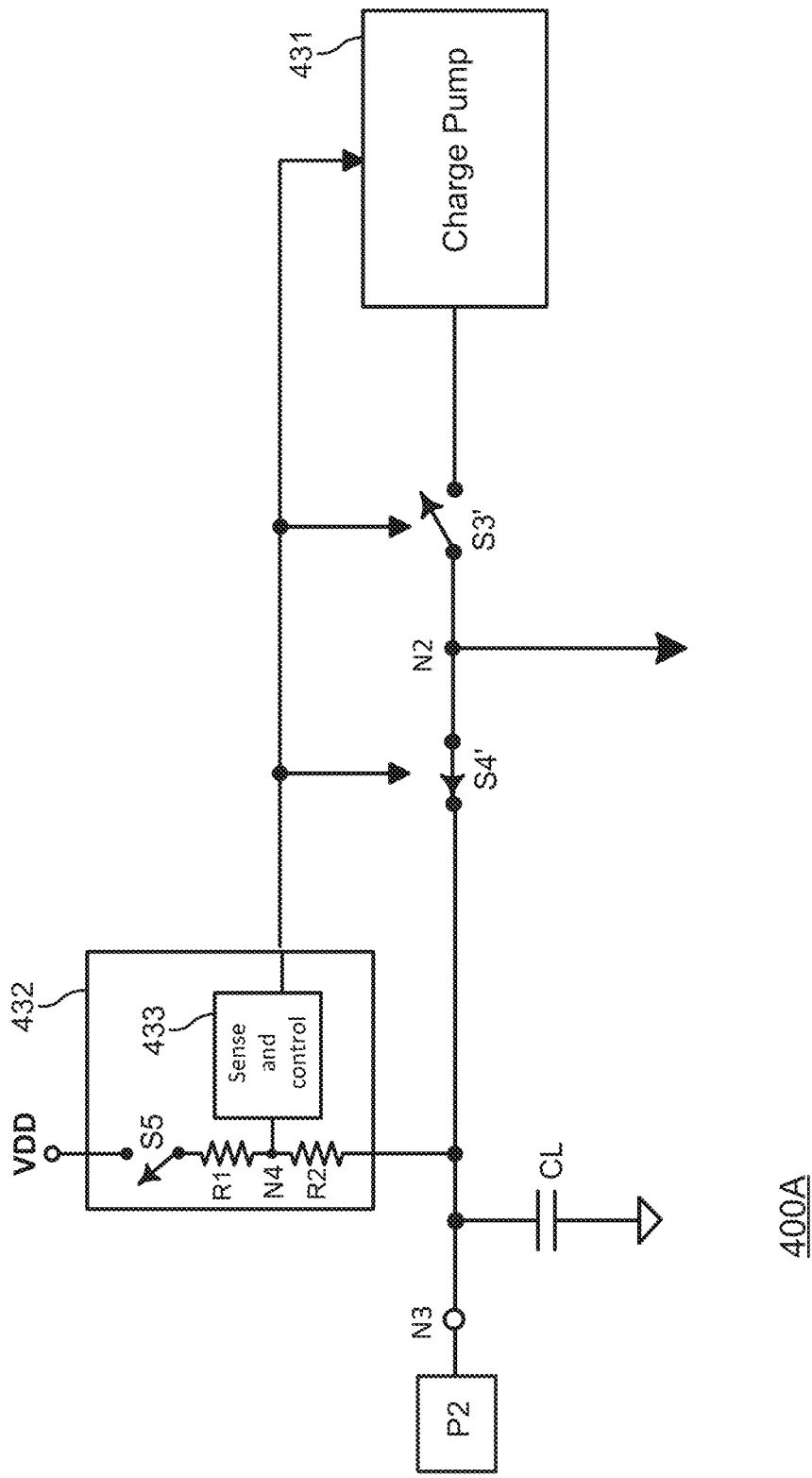
FIGS. 4A-4B show exemplary embodiments according to the teachings of the present disclosure, illustrating how the presence/absence of an external power supply is detected and the mode of operation is set accordingly.
Figure 4B:
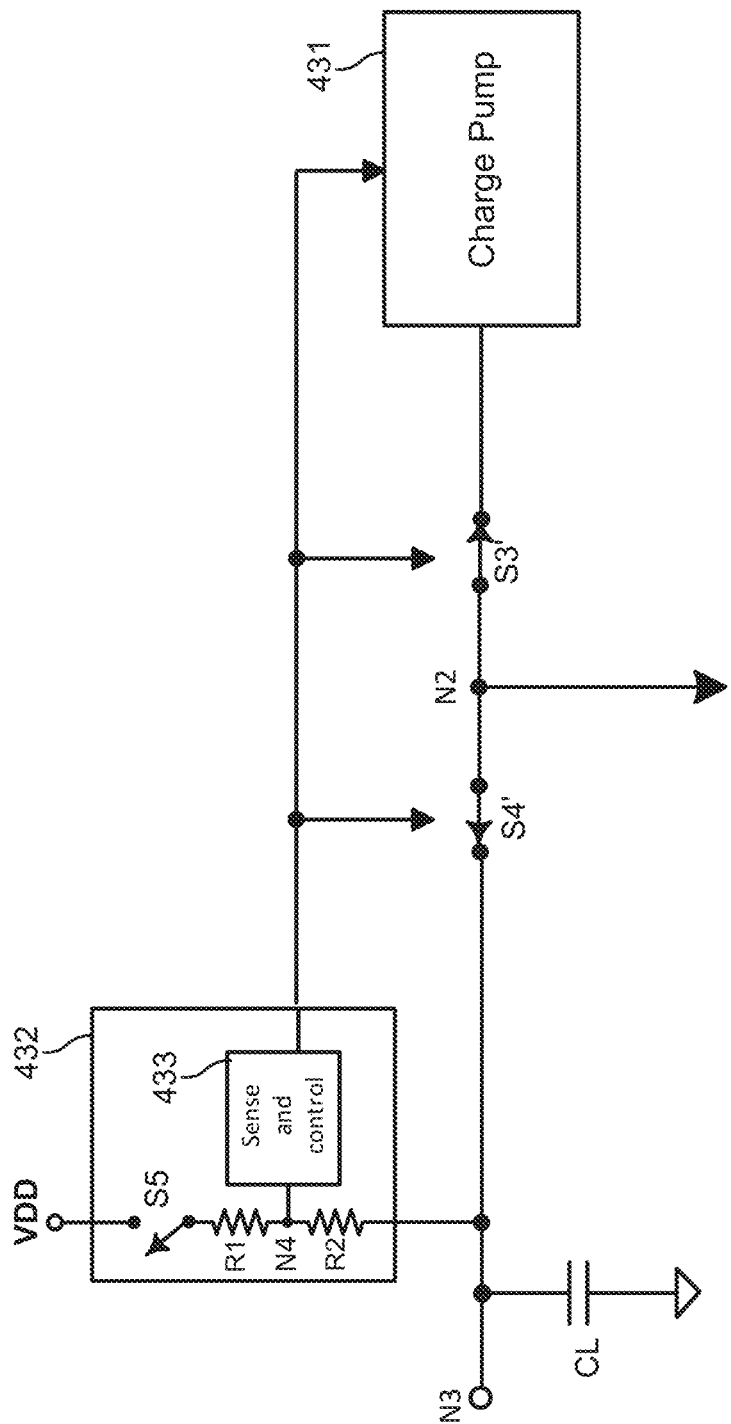

FIGS. 4A-4B shows exemplary embodiments according to the teachings of the present disclosure, illustrating how the presence/absence of an external power supply is detected and the mode of operation is set accordingly. Detector and control module (432) of FIGS. 4A-4B is analogous to detector and module (232) of FIG. 2A-2B, and includes sense and control module (433), resistors (R1, R2), and switch (S5). The combination of series resistors (R1, R2) and switch (S5) couples positive bias voltage (VDD) to terminal (N3). As shown in FIG. 2A-2B, positive bias voltage (VDD) is provided via the positive external power supply (P1). FIG. 4A corresponds to the first mode of operation where external power supply (P2) is connected at terminal (N3). As such, there is a negative voltage, e.g. −3.5V appearing at terminal (N3). During the start-up and during the waiting time ($\Delta T_w$), switch (S5) is closed, and resistors (R1, R2) are selected such that the voltage at terminal (N4) which is sensed by sense and control module (433) is a negative voltage. As a result, the sense and control module (433) issues control signals to close switch (S4') and open switch (S3'). In other words, the charge pump (431) is switched out and the negative voltage required by the rest of the circuit is provided by external power supply (P2). In the first mode, load capacitor (CL) is optional and if implemented, such load capacitor may be used for purpose of filtering the output of the external power supply (P2).

FIG. 4B corresponds to the second mode where terminal (N3) is left open and without any connection to an external power supply. As such, during waiting time ($\Delta T_w$), switch (S5) is closed, and a positive voltage at terminal (N4) is sensed so that sense and control module (433) will issue this time control signals to close both switches (S3', S4). This way, at the startup, external load capacitor (CL) is charged using the charge pump and the stored negative charge can be used later on, during the normal operation, to provide the required negative voltage required by the rest of the circuit. By virtue of having the possibility of implementing a larger load capacitor (CL) disposed outside the integrated circuit, there will be enough negative charge stored during the operation and this will overcome the issues of power slump as described previously.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions have been greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Some disclosed devices detect the presence/absence of a negative bias voltage while implementing a positive supply voltage. Some other disclosed devices detect the presence/absence of a positive bias voltage while implementing a negative supply voltage Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

The invention claimed is:

1. An integrated circuit comprising
   an internal negative power supply internal to the integrated circuit;
   a detector and control circuit configured to connect and disconnect the internal negative power supply to/from a negative bias voltage terminal internal to the integrated circuit,
   wherein
   in a first mode, upon detection of the presence of an external negative power supply external to the integrated circuit, the detector and control circuit is configured to disconnect the internal negative power supply from the negative bias voltage terminal;
   in a second mode, upon detection of the absence of the external negative power supply external to the integrated circuit, the detector and control circuit is configured to connect the internal negative power supply to the negative bias voltage terminal to provide an internally sourced negative bias voltage to the integrated circuit;

the detection of the presence of the external negative power supply is indicated at a first time instant within a set waiting period during a startup of the integrated circuit, and the detection of the absence of the external negative power supply is indicated at a second time instant greater than the first time instant and outside the set waiting period.

2. The integrated circuit of claim 1, wherein the internal negative power supply comprises a negative charge pump.

3. The integrated circuit of claim 2, further comprising a first switch controllable by the detector and control circuit, the first switch being configured for connecting and disconnecting the negative charge pump to/from the negative bias voltage terminal.

4. The integrated circuit of claim 3, further comprising a second switch controllable by the detector and control circuit, the second switch configured for connecting and disconnecting a terminal of the external power supply to/from the negative bias voltage terminal.

5. A circuital arrangement comprising the integrated circuit of claim 1 and an external positive power supply external to the integrated circuit, the external positive power supply configured to be connected to a positive bias voltage terminal internal to the integrated circuit to provide an externally sourced positive bias voltage to the integrated circuit.

6. A circuital arrangement comprising the integrated circuit of claim 1 and an external load capacitance, the external load capacitance being coupled between the negative bias voltage terminal and a reference voltage.

7. The integrated circuit of claim 6, wherein the external load capacitance is external to the integrated circuit and has a capacitance within a range of 7 nF to 20 nF.

8. The circuital arrangement of claim 5, wherein the detector and control circuit comprise a series combination of a first resistor, a second resistor, and a third switch, the series combination selectively coupling the external negative power supply to the negative bias voltage terminal.

9. An integrated circuit comprising
an internal negative power supply internal to the integrated circuit;
a detector and control circuit configured to connect and disconnect the internal negative power supply or an external negative power supply to/from a negative bias voltage terminal internal to the integrated circuit,
wherein
in a first mode, upon detection of presence of the external negative power supply external to the integrated circuit and connectable to the integrated circuit, the detector and control circuit is configured to disconnect the internal negative power supply from the negative bias voltage terminal and connect the external negative power supply to the negative bias voltage terminal to provide an externally sourced negative bias voltage to the integrated circuit; and
in a second mode, upon detection of absence of the external negative power supply external to the integrated circuit, the detector and control circuit is configured to connect the internal negative power supply to the negative bias voltage terminal to provide an internally sourced negative bias voltage to the integrated circuit,
wherein
the detection of the presence of the external negative power supply is indicated at a first time instant within a set waiting period during a startup of the integrated circuit, and
the detection of the absence of the external negative power supply is indicated at a second time instant greater than the first time instant and outside the set waiting period.

10. The integrated circuit of claim 9, wherein the internal negative power supply comprises a negative charge pump.

11. The integrated circuit of claim 10, further comprising a first switch controllable by the detector and control circuit, the first switch being configured for connecting and disconnecting the negative charge pump to/from the negative bias voltage terminal.

12. The integrated circuit of claim 11, further comprising a second switch controllable by the detector and control circuit, the second switch configured for connecting and disconnecting a terminal of the external power supply to/from the negative bias voltage terminal.

13. A circuital arrangement comprising the integrated circuit of claim 9 and an external positive power supply external to the integrated circuit, the external positive power supply configured to be connected to a positive bias voltage terminal internal to the integrated circuit to provide an externally sourced positive bias voltage to the integrated circuit.

14. A circuital arrangement comprising the integrated circuit of claim 9 and an external load capacitor, the external load capacitor being external to the integrated circuit, and coupling the negative bias voltage terminal to ground.

15. The circuital arrangement of claim 14, wherein the external load capacitor has a capacitance within a range of 7 nF to 20 nF.

16. The circuital arrangement of claim 13, wherein the detector and control circuit comprises a series combination of a first resistor, a second resistor, and a third switch, the series combination selectively coupling the external negative power supply to the negative bias voltage terminal.

17. A method of providing a negative bias voltage to a negative bias voltage terminal of an integrated circuit, the negative bias voltage terminal being internal to the integrated circuit, the integrated circuit comprising an internal negative power supply, the method comprising:
in a first mode:
at a first time instant within a set waiting period during a startup of the integrated circuit, detecting presence of an external negative power supply external to the integrated circuit;
disconnecting the negative internal power supply from the internal negative bias voltage terminal; and
connecting the external negative power supply to the negative bias voltage terminal, and
in a second mode:
at a second time instant greater than the first time instant and outside the set waiting period, detecting absence of the external negative power supply;
coupling the negative bias voltage terminal to ground via an external load capacitor, the external load capacitor being disposed external to the integrated circuit;
connecting the internal negative power supply to the negative bias voltage terminal, thereby charging the external load capacitor with negative charge served as the negative bias voltage.

18. The method of claim 17, wherein the internal negative power supply is a charge pump.

19. The method of claim 17, wherein the external load capacitor has a capacitance within a range of 7 nF to 20 nF.

20. The method of claim 17, further comprising connecting an external positive power supply to a positive bias voltage terminal internal to the integrated circuit.

* * * * *